(12) United States Patent
Yu et al.

(10) Patent No.: US 9,363,739 B2
(45) Date of Patent: Jun. 7, 2016

(54) OPTIMIZATION ON NETWORK ASSISTED PROXIMITY SERVICES DISCOVERY MANAGEMENT

(71) Applicant: NOKIA SOLUTIONS AND NETWORKS OY, Espoo (FI)

(72) Inventors: Ling Yu, Oulu (FI); Vinh Van Phan, Oulu (FI); Kari Veikko Horneman, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/513,992

(22) Filed: Oct. 14, 2014

(65) Prior Publication Data

US 2015/0031359 A1    Jan. 29, 2015

Related U.S. Application Data

(62) Division of application No. 13/601,168, filed on Aug. 31, 2012, now Pat. No. 8,903,419.

(51) Int. Cl.
*H04W 48/16* (2009.01)
*H04W 8/00* (2009.01)
*H04L 29/08* (2006.01)
*H04W 76/02* (2009.01)

(52) U.S. Cl.
CPC .............. *H04W 48/16* (2013.01); *H04L 67/16* (2013.01); *H04W 8/005* (2013.01); *H04W 76/02* (2013.01); *H04W 76/023* (2013.01)

(58) Field of Classification Search
None
See application file for complete search history.

(56) References Cited

U.S. PATENT DOCUMENTS

| | | | |
|---|---|---|---|
| 8,903,419 B2 * | 12/2014 | Yu | H04L 67/16 455/456.1 |
| 2011/0098043 A1 | 4/2011 | Yu et al. | |
| 2011/0258049 A1 | 10/2011 | Ramer et al. | |
| 2011/0258313 A1 | 10/2011 | Mallik et al. | |
| 2011/0268101 A1 | 11/2011 | Wang et al. | |
| 2012/0209705 A1 | 8/2012 | Ramer et al. | |
| 2012/0215626 A1 | 8/2012 | Ramer et al. | |
| 2014/0321282 A1 * | 10/2014 | Pragada | H04W 36/0072 370/235 |
| 2015/0057009 A1 * | 2/2015 | Panchal | H04W 16/14 455/452.1 |
| 2015/0138988 A1 * | 5/2015 | Shaw | H04L 41/5025 370/241 |
| 2015/0195057 A1 * | 7/2015 | Tan | H04J 11/005 370/252 |

FOREIGN PATENT DOCUMENTS

WO    2011/063845 A1    6/2011

OTHER PUBLICATIONS

Fusco et al., "Exploring the Social Implications of Location Based Social Networking" IEEE, Computer Society, 2010 9th International Conference on Mobile Business, 2010, pp. 230-237.

(Continued)

*Primary Examiner* — Diane Mizrahi
(74) *Attorney, Agent, or Firm* — Squire Patton Boggs (US) LLP

(57) ABSTRACT

Methods, apparatuses, and computer program products for network assisted ProSe discovery management are provided. One method includes establishing, by a network element, a discovery context of a user equipment, and transmitting a discovery context establishment request comprising beacon information on at least one other user that a user of the user equipment is interested in discovering.

17 Claims, 4 Drawing Sheets

(56) References Cited

OTHER PUBLICATIONS

Ga Bor Fodor et al., "Design aspects of network assisted device-to-device communications"; IEEE Communications Magazine; vol. 50, No. 3, Mar. 1, 2012, pp. 170-177, XP011429640, ISSN: 0163-6804, DOI:10.1109/MCOM.2012.6163598; p. 172 col. 2, line 37, figure 3.
International Search Report and Written Opinion dated Dec. 23, 2013, issued in corresponding International Application No. PCT/EP2013/066052.
3GPP TR 22.803 V0.2.0 (Feb. 2012) "3rd Generation Partnership Project; Technical Specification Group SA; Feasibility Study for Proximity Services (ProSe) (Release 12)", 17 pages.
3GPP TR 22.803 V0.5.0 (Aug. 2012); "3rd Generation Partnership Project; Technical Specification Group SA; Feasibility Study for Proximity Services (ProSe) (Release 12)"; 34 pages; 3rd Generation Partnership Project (3GPP); Mobile Competence Centre; 650, Route des Lucioles; F-06921 Sophia-Antipolis Cedex; France.
International Search Report application No. PCT/EP2013/066052 mailed Dec. 13, 2013.

\* cited by examiner

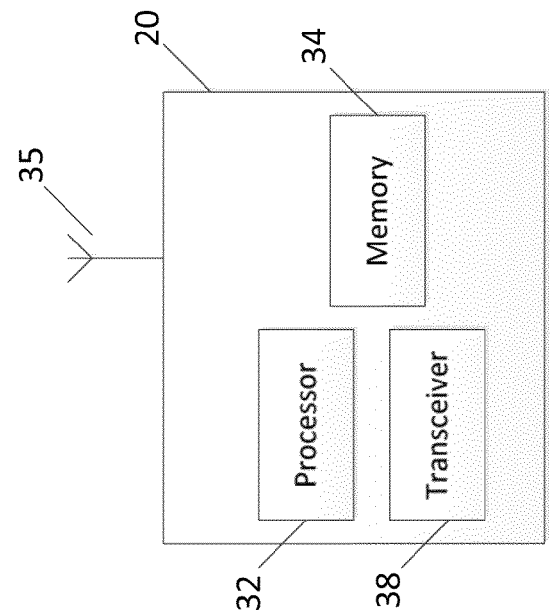
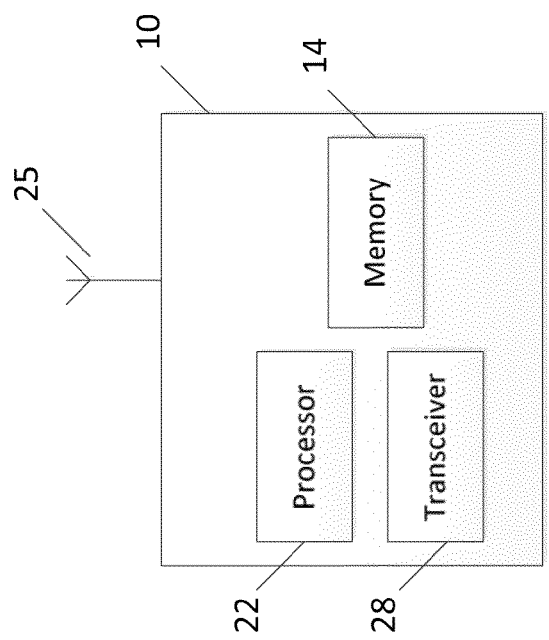

OPTIMIZATION ON NETWORK ASSISTED PROXIMITY SERVICES DISCOVERY MANAGEMENT

CROSS REFERENCE TO RELATED APPLICATION

This application is a Divisional Application of U.S. application Ser. No. 13/601,168 filed Aug. 31, 2012, the contents of which application is herein incorporated by reference.

BACKGROUND

1. Field

Embodiments of the invention generally relate to wireless communications systems, such as, but not limited to, the Universal Mobile Telecommunications System (UMTS) Terrestrial Radio Access Network (UTRAN) and/or Long Term Evolution (LTE) Evolved UTRAN (E-UTRAN). Some embodiments relate proximity services (ProSe) in such communications systems.

2. Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN) no RNC exists and most of the RNC functionalities are contained in the eNodeB (enhanced Node B).

Long Term Evolution (LTE) or E-UTRAN refers to improvements of the UMTS through improved efficiency and services, lower costs, and use of new spectrum opportunities. In particular, LTE is a 3rd generation partnership project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE is also expected to improve spectral efficiency in 3G networks, allowing carriers to provide more data and voice services over a given bandwidth. Therefore, LTE is designed to fulfill future needs for high-speed data and media transport in addition to high-capacity voice support. Advantages of LTE are, for example, high throughput, low latency, FDD and TDD support in the same platform, an improved end-user experience, and a simple architecture resulting in low operating costs.

Further releases of 3GPP LTE (e.g., LTE Rel-11, LTE-Rel-12) are targeted towards future international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A will be a more optimized radio system fulfilling the international telecommunication union-radio (ITU-R) requirements for IMT-Advanced while keeping the backward compatibility.

SUMMARY

One embodiment is directed to a method including initiating, by a user equipment, establishment of a discovery context. The initiating may include transmitting a discovery context indication to a network, and the discovery context indication may include information about at least one other user that a user of the user equipment is interested in discovering. The method may further include receiving a discovery context establishment request from the network. The discovery context establishment request may include, when the discovery context of the at least one other user is available in the network, beacon information for the at least one other user that the user of the user equipment is interested in discovering.

Another embodiment includes an apparatus. The apparatus includes at least one processor, and at least one memory including computer program code. The at least one memory and computer program code, with the at least one processor, cause the apparatus at least to transmit a discovery context indication to a network to initiate establishment of a discovery context. The discovery context indication may include information about at least one other user that a user of the apparatus is interested in discovering. The at least one memory and computer program code, with the at least one processor, also cause the apparatus at least to receive a discovery context establishment request from the network. The discovery context establishment request may include, when the discovery context of the at least one other user is available in the network, beacon information for the at least one other user that the user of the apparatus is interested in discovering.

Another embodiment is directed to a computer program embodied on a non-transitory computer readable medium. The computer program is configured to control a processor to perform a process. The process includes initiating, by a user equipment, establishment of a discovery context. The initiating may include transmitting a discovery context indication to a network, and the discovery context indication may include information about at least one other user that a user of the user equipment is interested in discovering. The process may further include receiving a discovery context establishment request from the network. The discovery context establishment request may include, when the discovery context of the at least one other user is available in the network, beacon information for the at least one other user that the user of the user equipment is interested in discovering.

Another embodiment includes an apparatus. The apparatus includes means for initiating establishment of a discovery context. The means for initiating may include means for transmitting a discovery context indication to a network, and the discovery context indication may include information about at least one other user that a user of the user equipment is interested in discovering. The apparatus may further include means for receiving a discovery context establishment request from the network. The discovery context establishment request may include, when the discovery context of the at least one other user is available in the network, beacon information for the at least one other user that the user of the user equipment is interested in discovering.

Another embodiment is directed to a method including establishing, by a network element, a discovery context of a user equipment, and transmitting a discovery context establishment request. The discovery context establishment request may include beacon information on at least one other user that a user of the user equipment is interested in discovering.

Another embodiment includes an apparatus. The apparatus includes at least one processor, and at least one memory including computer program code. The at least one memory and computer program code, with the at least one processor, cause the apparatus at least to establish a discovery context of a user equipment, and transmit a discovery context establishment request to the user equipment. The discovery context establishment request may include beacon information on at least one other user that a user of the user equipment is interested in discovering.

Another embodiment is directed to an apparatus. The apparatus includes means for establishing a discovery context of a user equipment, and means for transmitting a discovery context establishment request. The discovery context establishment request may include beacon information on at least one other user that a user of the user equipment is interested in discovering.

Another embodiment is directed to a computer program embodied on a non-transitory computer readable medium. The computer program is configured to control a processor to perform a process. The process includes establishing a discovery context of a user equipment, and transmitting a discovery context establishment request. The discovery context establishment request may include beacon information on at least one other user that a user of the user equipment is interested in discovering.

BRIEF DESCRIPTION OF THE DRAWINGS

For proper understanding of the invention, reference should be made to the accompanying drawings, wherein:

FIG. 3a illustrates an apparatus according to an embodiment;

FIG. 3b illustrates an apparatus according to another embodiment;

DETAILED DESCRIPTION

Figure 1:
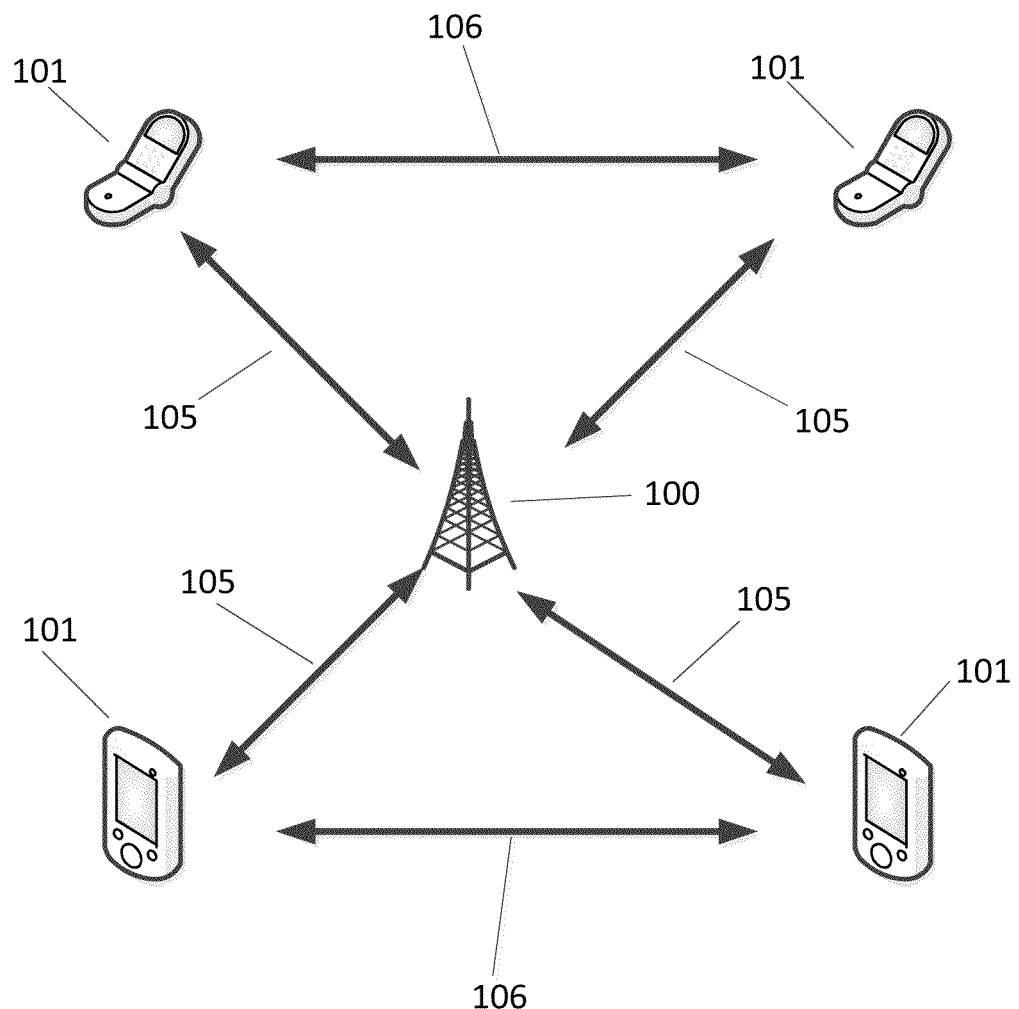
FIG. 1 illustrates a system according to one embodiment.

It will be readily understood that the components of the invention, as generally described and illustrated in the figures herein, may be arranged and designed in a wide variety of different configurations. Thus, the following detailed description of the embodiments of systems, methods, apparatuses, and a computer program products for network assisted ProSe discovery management, as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Some embodiments of the invention are applicable to LTE-A, including 3GPP LTE-A Rel-12, which addresses LTE-A supports for network-controlled device-to-device (D2D) discovery. The 3GPP has begun carrying out a study for potential services and requirements for D2D communications, referred to as Proximity Services (ProSe). One objective is to study use cases and identify potential requirements for an operator network controlled discovery and communications between devices that are in proximity, under continuous network control, and/or are under 3GPP network coverage. This could be for the purposes of commercial/social use, network offloading, public safety, and/or integration of current infrastructure services to assure the consistency of the user experience including reachability and mobility aspects. With respect to public safety, requirements are being identified for securing public safety in the absence of E-UTRAN coverage (e.g., subject to regional regulation and operator policy, and limited to specific public-safety designated frequency bands and terminals).

Several ProSe commercial use cases have been drafted in 3GPP TR22.803, in which some social use cases (e.g., basic social use case and the use case of using ProSe to enhance location and presence services) require the so-called "closed" discovery. The "closed" discovery means that a ProSe capable device can only be discovered by some selected devices, such as by the devices of friends in certain social networking applications.

For proximity device discovery in general, the most straightforward method is to have a device broadcast a beacon signal at certain time intervals to allow the other devices to detect the presence of the device broadcasting the beacon signal. However, in the context of the proximity discovery for social use and also considering the radio resource efficiency and power consumption on transmitting/detecting a beacon signal, it is preferable that a device transmits beacon signals only when there are potential devices of friends who are interested in discovering the device and a device tries to monitor beacon signals transmitted by his/her friends' devices only when proximity discovery is potentially possible between them.

Therefore, certain network assistance may be beneficial to coordinate the device discovery for a closed group. However, the network assistance requires at least some additional signaling exchange between the network and devices that may increase the control signaling overhead, especially if devices stay in radio resource control (RRC) idle state when no other active service is running on the device. Herein, one problem is how to allow the network to manage the ProSe discovery related information (e.g., allocation of beacon signals and notification of the allocated beacon signals based on friend relationship) in an efficient and optimized way in terms of resource usage, power consumption, control signaling overhead, etc.

FIG. 1 illustrates an example of a D2D capable communication system, according to one embodiment. As illustrated in FIG. 1, D2D capable UEs 101 can communicate with an eNB 100 via wireless communication links 105. In addition, the D2D capable UEs 101 may communicate directly with each other via wireless communication links 106. FIG. 1 does not necessary illustrate all components or devices that may be included in the system according to certain embodiments, rather only those devices that are necessary for understanding the invention are illustrated.

Embodiments of the invention are directed to optimization possibilities on the network management and signaling transmission, including radio resource control (RRC) connected and idle mode UEs, to facilitate proximity device discovery. Some embodiments may be particularly applicable to social use with the following assumptions:

The list of friends that one user is interested in discovering is available in the network either in the form of phone numbers or other UE identifiers. It may be an overall list for all the applications that the user uses or each application specific list is maintained in the network.

It is assumed that the number of beacon channels (separated in code, frequency and time domain) is large enough to have dedicated one for each UE in certain local area.

Embodiments of the invention introduce a new discovery context as part of the UE context both in the UE and on the network side. Embodiments also provide the corresponding discovery context management procedures to synchronize the discovery context between the devices (e.g., UEs) and the network (e.g., mobility management entity (MME)/D2D Registration Server Function (DRSF), evolved node Bs eNBs)).

In one embodiment, the discovery context may include: information on a list of friends that the user is interested in discovering and in which proximity discovery is potentially possible (e.g., in same tracking area for idle UEs, same/neighbouring cells for active UEs or same D2D area upon D2D registration), the allocated beacon channel of each friend in above list, the list of friends who is interested in discovering the user, the identification (e.g., pre-configured ID) of a ProSe feature enabled application (e.g., social networking application with ProSe feature enabled) of each friend using if available by the network, etc.

According to an embodiment, the establishment or release of the discovery context may be initiated by either the UE or the network. The UE initiated discovery context establishment/release may be triggered, for example, when the user of the UE opens/closes the ProSe feature enabled application on the UE. The network initiated establishment may be triggered, for instance, when the network detects that in the same local area there is at least one friend who either is interested in discovering the user of the UE or the user of the UE is interested in discovering, and the UE has no discovery context established yet. The network may release the discovery context of the UE on many grounds including actual need for service discontinuity of discovery services due to network capacity, operational or performance optimization conditions for providing such discovery services, etc. These grounds can be monitored and determined by the network, as needed.

A discovery context update (which may also include discovery context release) may be requested by the UE or indicated by the network with at least the following possible triggers: the user of the UE changed the proximity discovery setting, e.g., friends list to be discovered; there is at least one friend whose on-line/off-line status of the ProSe feature enabled application changed; the UE woke up from long discontinuous reception (DRX) or changed from RRC idle to active state; the network detects that at least one friend who is interested in discovering the user of the UE came/left the local area; the network detects that at least one friend whom the user of the UE is interested in discovering came/left the local area; and/or the discovery context of friends was updated and the updated context is relevant to the UE in question.

In one embodiment, the control messages for discovery context establishment/update may be implemented as non-access stratum (NAS) signaling. The control messages may be standalone control messages or embedded into Tracking Area Update/D2D Registration Request/D2D Area Update/Handover Control messages.

Another embodiment provides optimized transmission on discovery context update control message. In this embodiment, a new Discovery Update Control Channel (DUCCH) and Discovery Update Channel (DUCH) as a logical channel and transport channel, respectively, are provided to carry the updated discovery context information for the UEs in idle mode in order to avoid the UE moving to an active state just for the discovery context update. Using LTE channel structures as an example, DUCH can be mapped to the physical downlink shared channel (PDSCH) and identified by discovery update-radio network temporary identifier (DU-RNTI) in physical downlink control channel (PDCCH) for resource allocation. According to an embodiment, the idle mode UE monitors DU-RNTI for possible discovery context update information and the precise UE identity is provided in the discovery update message. The transmission of discovery update message for each idle mode UE can be linked with a paging occasion of the UE so that the UE can use the same DRX cycle for monitoring paging and discovery update message.

In an embodiment, in order to further optimize transmission of a discovery context update message and also a paging message, some selected active UEs may be configured to listen to beacon signals (sent by either active UE or idle UE) and report the detected beacon signals to the network. Based on the reported beacon signals from the active UEs, the network may be able to track idle UE's location on a cell level. Thus, the transmission of the discovery context update message and the paging message may be only needed in one cell instead of multiple cells of the registered tracking area.

Figure 2:
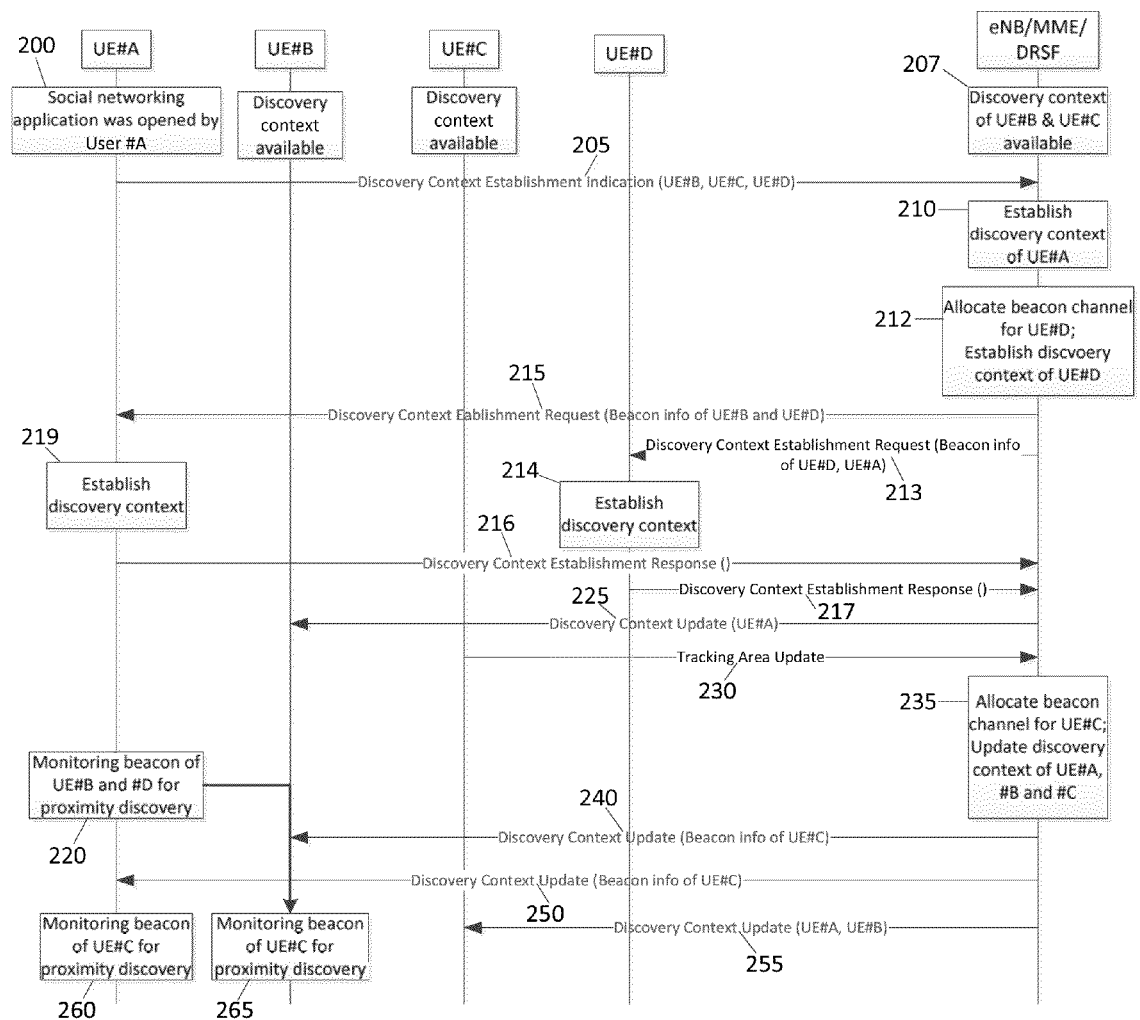
FIG. 2 illustrates an example of a signaling diagram according to one embodiment.

FIG. 2 illustrates an example signaling diagram of a discovery context management procedure, according to one embodiment. In the example of FIG. 2, the discovery context update message may be implemented on the dedicated control channel for RRC active state UEs and on common DUCH for UEs in RRC idle state. The application related information, if available by the controlling cellular network, may be included in the discovery context to facilitate the management of proximity discovery by the network.

As illustrated in FIG. 2, at 200, a social networking application is opened by the user of UE#A who is interested in discovering UE#B and UE#C. As a result, at 205, UE#A transmits a discovery context establishment indication, indicating that it is seeking to discover UE#B, UE#C, and UE#D to the eNB/mobility management entity (MME)/D2D Registration Server Function (DRSF). In this embodiment, the discovery context of UE#B and UE#C is available at 207 due to other users being interested in discovering them. However, in this example, the discovery context of UE#D is not initially available.

At 210, the eNB/MME/DRSF establishes the discovery context of UE#A and may also allocate beacon channel for UE#A if there is any other potential user who has discovery context in the eNB/MME/DRSF and is interested in discovering UE#A. At 212, the eNB/MME/DRSF allocates a beacon channel for UE#D and establishes discovery context of UE#D. The eNB/MME/DRSF then sends a discovery context establishment request to UE#D at 213. In one embodiment the discovery context establishment request 213 sent to UE#D may include the beacon information of UE#D and the identity of UE#A. In this example, UE#D is informed of its own beacon information because it will broadcast the beacon signal accordingly to allow other UEs (e.g., UE#A) to discover it. On the other hand, UE#D may not be informed of the beacon info of UE#A if UE#D is not interested in discovering UE#A. In this case, UE#D is only informed the identity (instead of beacon info) of UE#A to show that UE#A is interested in discovering UE#D. At 214, UE#D establishes the discovery context. At 217, a discovery context establishment response is sent from UE#D to the eNB/MME/DRSF.

According to an embodiment, if UE#D is in an active state, then the transfer of the context establishment request from the network can be sent over an existing dedicated control channel of UE#D. However, if UE#D is in an idle state, then UE#D may need to be paged first in order to have UE#D move into an active state and then the network can send the request to UE#D for the initial D2D context establishment. For D2D context update, the DUCCH/DUCH can be used for both idle and active UEs instead of, or in addition to, the above options. Using DUCCH/DUCH, an idle UE may remain in an idle state while being updated of D2D context.

Continuing with FIG. 2, discovery context establishment request is transmitted from the eNB/MME/DRSF to UE#A at 215. The discovery context establishment request may contain the beacon information of UE#B if discovery context of UE#B is available in the network and proximity discovery between UE#A and UE#B is seen potential. It may also contain the beacon information of UE#A if allocated. At 216, UE#A sends a discovery context establishment response to the eNB/MME/DRSF. At 219, UE#A establishes the discovery context In some embodiments, steps 213 and 214 and steps 215 and 216 may be performed in parallel or simultaneously. Similarly, in an embodiment, steps 210 and 212 may be performed simultaneously.

After receiving the beacon information of UE#B, at 220, UE#A is monitoring the beacon of UE#B for proximity discovery. At 225, the eNB/MME/DRSF transmits a discovery context update to UE#B that is triggered, for example, by the discovery context establishment of UE#A.

Continuing with the example of FIG. 2, at 230, UE#C transmits a tracking area update to the eNB/MME/DRSF. At 235, the eNB/MME/DRSF allocates a beacon channel for UE#C and updates discovery context of UE#A, UE#B, and UE#C. At 240 and 250, the eNB/MME/DRSF transmits a discovery context update with beacon information of UE#C to UE#B and UE#A, respectively. At 255, the eNB/MME/DRSF transmits a discovery context update to UE#C that may be triggered, for example, by allocating/updating a discovery channel for UE#C and/or the interest of UE#A and UE#B in discovering UE#C. At 260, UE#A is monitoring the beacon of UE#C for proximity discovery. Similarly, at 265, UE#B is monitoring the beacon of UE#C for proximity discovery.

Triggers for the discovery-context update request or indication from either the device (e.g., UE) side or the network side may consider the following particular scenarios, as examples. In one scenario, the "always-on" UE waking up from a long DRX state may indicate its existing UE discovery context to request an update from the network or the network initiates the sending of an update to the waking-up UE by itself. In another scenario, as UEs may have different social networking applications which have different corresponding user groups or sub-groups and discovery needs in their devices, the indication/request of actual needs from time-to-time (which user groups or sub-groups for which active applications) in a discovery-context update may help avoid unnecessary signalling overhead.

According to some embodiments, multiple users may use the same UE device to access ProSe applications. In this case, a single UE may be configured to maintain multiple discovery contexts, and each discovery context may correspond to one user. The same beacon channel/signal may be shared by multiple discovery contexts or different beacon channels/signals can be allocated. As an example, a parent and child may use the same UE device to access their respective accounts on a social networking application. In this situation, the UE can register for D2D or ProSe service for both the parent and child, which form a user group having individual user IDs (e.g., nickname, e-mail address) mapped on the same ID of the UE, such as a phone number The UE in this case may be assigned with a single beacon signal for the registered user group, or assigned more than one beacon signals in a flexible manner ranging from one dedicated to the group leader or the phone owner (the mother) and the rest of the group members may be assigned with individual or shared beacon signal(s). Then, depending on who is/are active users of the social networking application on the same UE device and whether such information can be made available and indicated to the network, one or more instances/records of ProSe discovery context may be established and managed by the network for individual users currently using the UE device accordingly. It is noted that, within an instance/record of one user, there may be sub-record(s) or context for each application registered. Another, less complicated option is that whenever the UE device is active and using ProSe, regardless of who is using what application, multiple instances will be established and maintained each for an individual of the registered group.

FIG. 3a illustrates an example of an apparatus 10 according to an embodiment. In one embodiment, apparatus 10 may be a UE supporting the discovery context procedures described herein. It should be noted that one of ordinary skill in the art would understand that apparatus 10 may include components or features not shown in FIG. 3a. Only those components or feature necessary for illustration of the invention are depicted in FIG. 3a.

As illustrated in FIG. 3a, apparatus 10 includes a processor 22 for processing information and executing instructions or operations. Processor 22 may be any type of general or specific purpose processor. While a single processor 22 is shown in FIG. 3a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas 25 for transmitting and receiving signals and/or data to and from apparatus 10. Apparatus 10 may further include a transceiver 28 configured to transmit and receive information. For instance, transceiver 28 may be configured to modulate information on to a carrier waveform for transmission by the antenna(s) 25 and demodulates information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

As mentioned above, according to one embodiment, apparatus 10 may be a UE. In this embodiment, apparatus 10 may be controlled by memory 14 and processor 22 to initiate establishment of a discovery context. In one embodiment, apparatus 10 may initiate the establishment of the discovery context by transmitting via transceiver 28, for example, a discovery context establishment indication to the network. According to one embodiment, the discovery context may include information about one or more other users or friends that the user of apparatus 10 is interested in discovering. Apparatus 10 may be further controlled by memory 14 and processor 22 to receive a discovery context establishment request from the network. In an embodiment, the discovery context establishment request may include beacon information for the one or more other users or friends that the user of apparatus 10 is interested in discovering. Apparatus 10 may also be controlled by memory 14 and processor 22 to monitor the beacon information for proximity discovery.

According to an embodiment, the discovery context may include information on the list of friends of which the user of apparatus 10 is interested in discovering and in which proximity discovery is seen as potentially possible (e.g., in same tracking area for idle UEs, same/neighbouring cells for active UEs, or same D2D area), the allocated beacon channel of each friend in the list, the list of friends who is interested in discovering the user, the identification (e.g., pre-configured ID) of ProSe feature enabled application (e.g. social networking application with ProSe feature enabled) of each friend using if available by the network, etc.

In some embodiments, apparatus 10 may be controlled by memory 14 and processor 22 to request a discovery context update from the network. The discovery context update request may be triggered, for example, when the user of apparatus 10 changes the proximity discovery setting, e.g., friends list to be discovered, when there is at least one friend whose on-line/off-line status of the ProSe feature enabled application changed, when apparatus 10 wakes up from long DRX or changes from RRC idle to active state, when the network detects that at least one friend who is interested in discovering the user of apparatus 10 came/left the local area, when the network detects that at least one friend whom the user of apparatus 10 is interested in discovering came/left the local area, and/or when discovery context of friends was updated and the updated context is relevant to the apparatus 10.

According to some embodiments, the initiating of the establishment or release of the discovery context may be triggered, for example, when the user of apparatus 10 opens or closes a ProSe feature enabled application on the apparatus 10.

As mentioned above, in an embodiment, the discovery context update may be carried in a DUCH as a transport channel. More specifically, according to some embodiments, when apparatus 10 is in a RRC idle state, the discovery context update is carried on a common DUCH. When apparatus 10 is in a RRC active state, the discovery context update may be implemented on a dedicated control channel. Further, in some embodiments, receipt of the discovery context update at apparatus 10 in idle state may be linked with the paging occasion of apparatus 10 so that apparatus 10 can use the same DRX cycle for monitoring paging and the discovery context update.

FIG. 3*b* illustrates an example of an apparatus 20 according to another embodiment. In an embodiment, apparatus 20 may be a network element supporting the discovery context procedures described herein. According to some embodiments, the network element may be a MME, DRSF, eNB, etc. It should be noted that one of ordinary skill in the art would understand that apparatus 20 may include components or features not shown in FIG. 3*b*. Only those components or feature necessary for illustration of the invention are depicted in FIG. 3*b*.

As illustrated in FIG. 3*b*, apparatus 20 includes a processor 32 for processing information and executing instructions or operations. Processor 32 may be any type of general or specific purpose processor. While a single processor 32 is shown in FIG. 3*b*, multiple processors may be utilized according to other embodiments. In fact, processor 32 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory ("RAM"), read only memory ("ROM"), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulates information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a network element, such as a MME, DRSF, or eNB. In this embodiment, apparatus 20 may be controlled by memory 34 and processor 32 to establish a discovery context of a UE, and to transmit a discovery context establishment request to the UE. The discovery context establishment request may include beacon information for one or more other users or friends that a user of the UE is interested in discovering. According to an embodiment apparatus 20 may be controlled to establish the discovery context of the UE when apparatus 20 detects that, in the same local area, there is at least one user/friend who is interested in discovering the user of the UE or whom the user of the UE is interested in discovering, and the UE has no discovery context established yet.

In an embodiment, apparatus 20 may be controlled by memory 34 and processor 32 to release the discovery context of the UE based on actual need for service continuity of discovery services, network capacity, and/or operational or performance optimization conditions for providing such discovery services. These factors can be monitored and determined by apparatus 20.

In some embodiments, apparatus 20 may be controlled by memory 34 and processor 32 to update the discovery context of the UE when certain conditions or triggers occur. For example, the triggers may include when the user of the UE changes the proximity discovery setting, e.g., friends list to be discovered, when there is at least one friend whose on-line/off-line status of the ProSe feature enabled application changed, when the UE wakes up from long DRX or changes from RRC idle to active state, when apparatus 20 detects that at least one friend who is interested in discovering the user of the UE came/left the local area, when apparatus 20 detects that at least one friend whom the user of the UE is interested in discovering came/left the local area, and/or when discovery context of friends was updated and the updated context is relevant to the UE.

Figure 4A:
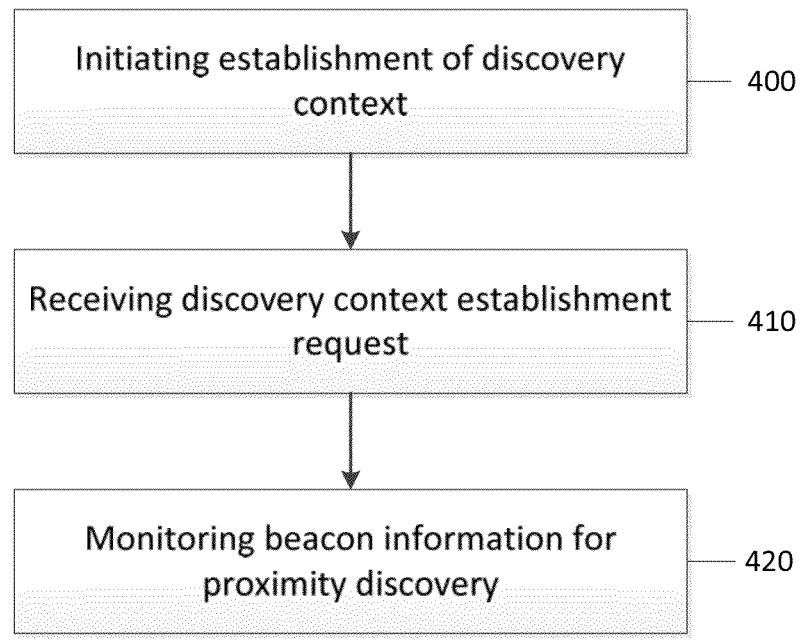
FIG. 4a illustrates a flow diagram of a method according to an embodiment.

FIG. 4a illustrates a flow diagram of a method according to one embodiment. In an embodiment, the method of FIG. 4a may be performed by a UE. According to one embodiment, the method includes, at 400, initiating establishment of a discovery context, which may include the transmitting of a context establishment indication to the network. The discovery context request may include information about one or more other users or friends that the user of the UE is interested in discovering. The method may further include, at 410, receiving a discovery context establishment request from the network. The discovery context establishment request may include beacon information for the one or more other users or friends that the user of the UE is interested in discovering. The method may then include, at 420, monitoring the beacon information for proximity discovery of the one or more other users or friends.

Figure 4B:
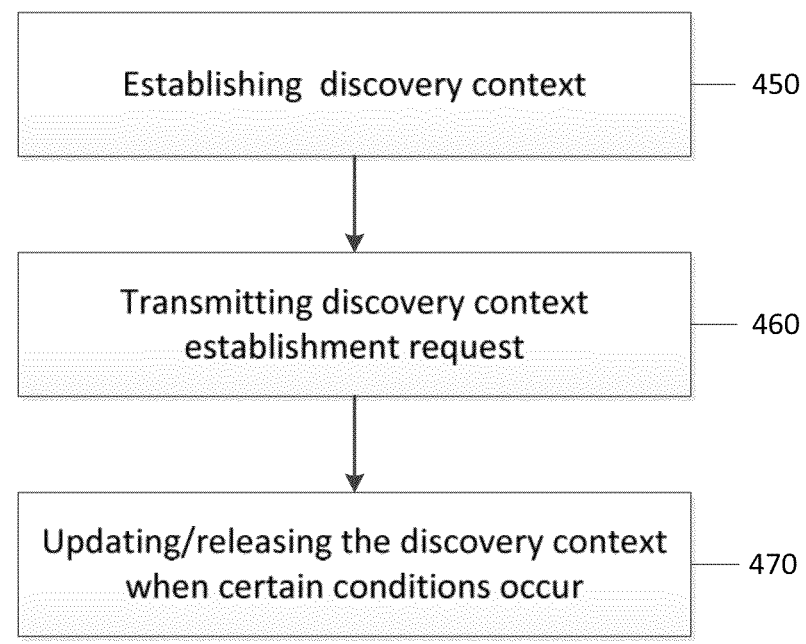
FIG. 4b illustrates a flow diagram of a method according to another embodiment.

FIG. 4b illustrates a flow diagram of a method according to one embodiment. In an embodiment, the method of FIG. 4b may be performed by a network element, such as a MME, DRSF, or eNB. The method may include, at 450, establishing a discovery context of a UE. In some embodiments, the discovery context may be established in response to an indication from the UE. The indication may include information about one or more other users or friends that the user of the UE is interested in discovering. At 460, the method may include transmitting a discovery context establishment request to the UE. The discovery context establishment request may include beacon information for the one or more other users or friends that the user of the UE is interested in discovering. In an embodiment, the method may further include, at 470, updating or releasing the discovery context when certain conditions or triggers occur, as discussed above.

In some embodiments, the functionality of any of the methods described herein, such as those of FIGS. 4a and 4b, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   establishing, by a network element, a discovery context for a first user equipment for a discovery of at least one second user equipment that a user of the first user equipment is interested in discovering;
   allocating a beacon channel to the at least one second user equipment; and
   transmitting to the first user equipment a request to establish a discovery context, the request comprising information on the allocated beacon channel.

2. The method according to claim 1, wherein the discovery context established by the network element comprises information on the at least one second user equipment that the user of the first user equipment is interested in discovering and in which proximity discovery is possible, the allocated beacon channel of the at least one second user equipment, a list of friends who is interested in discovering the user of the first user equipment, an identification of a proximity services (ProSe) feature enabled application being used on the at least one second user equipment.

3. The method according to claim 1, wherein the establishing of the discovery context is triggered when the network element detects that, in a same local area, there is at least one friend who is interested in discovering the user of the first user equipment or whom the user of the first user equipment is interested in discovering, and the first user equipment has no discovery context established yet.

4. The method according to claim 1, further comprising releasing the discovery context of the first user equipment based on at least one of actual need for service continuity of discovery services, network capacity, or operational or performance optimization conditions for providing such discovery services.

5. The method according to claim 1, further comprising updating the discovery context of the first user equipment, wherein the updating is triggered when the user of the first user equipment changes a proximity discovery setting, when there is at least one friend whose on-line/off-line status of proximity services (ProSe) feature enabled application changed, when the first user equipment wakes up from long discontinuous reception (DRX) or changes from an idle to active state, when the network element detects that at least one friend who is interested in discovering the user of the first user equipment came or left the local area, when the network element detects that at least one friend whom the user of the first user equipment is interested in discovering came or left the local area, or when discovery context of friends was updated and the updated context is relevant to the first user equipment.

6. The method according to claim 1, wherein control messages for the establishing of the discovery context and/or the updating of the discovery context are implemented as non-access stratum NAS signaling.

7. The method according to claim 1, wherein, when the first user equipment is in an idle state, the updating of the discovery context is carried on a discovery update channel (DUCH).

8. The method according to claim 1, further comprising receiving a report of beacon signals detected by one or more active user equipment so that the network element can track a location of idle user equipment on a cell level and the updating of the discovery context is carried on the discovery update channel (DUCH) of the tracked cell.

9. An apparatus, comprising:
at least one processor; and
at least one memory comprising computer program code,
the at least one memory and the computer program code configured, with the at least one processor, to cause the apparatus at least to
establish a discovery context for a first user equipment for a discovery of at least one second user equipment that a user of the first user equipment is interested in discovering;
allocate a beacon channel to the at least one second user equipment; and
transmit to the first user equipment a request to establish a discovery context, the request comprising information on the allocated beacon channel.

10. The apparatus according to claim 9, wherein the discovery context established by the apparatus comprises information on the at least one second user equipment that the user of the first user equipment is interested in discovering and in which proximity discovery is possible, the allocated beacon channel of the at least one second user equipment, a list of friends who is interested in discovering the user of the first user equipment, an identification of a proximity services (ProSe) feature enabled application being used on the at least one second user equipment.

11. The apparatus according to claim 9, wherein the at least one memory and the computer program code are further configured, with the at least one processor, to cause the apparatus at least to establish the discovery context when the apparatus detects that, in a same local area, there is at least one friend who is interested in discovering the user of the first user equipment or whom the user of the first user equipment is interested in discovering, and the first user equipment has no discovery context established yet.

12. The apparatus according to claim 9, wherein the at least one memory and the computer program code are further configured, with the at least one processor, to cause the apparatus at least to release the discovery context of the first user equipment based on at least one of actual need for service continuity of discovery services, network capacity, or operational or performance optimization conditions for providing such discovery services.

13. The apparatus according to claim 9, wherein the at least one memory and the computer program code are further configured, with the at least one processor, to cause the apparatus at least to update the discovery context of the first user equipment, wherein the updating is triggered when the user of the first user equipment changes a proximity discovery setting, when there is at least one friend whose on-line/off-line status of proximity services (ProSe) feature enabled application changed, when the first user equipment wakes up from long discontinuous reception (DRX) or changes from an idle to active state, when the apparatus detects that at least one friend who is interested in discovering the user of the first user equipment came or left the local area, when the apparatus detects that at least one friend whom the user of the first user equipment is interested in discovering came or left the local area, or when discovery context of friends was updated and the updated context is relevant to the first user equipment.

14. The apparatus according to claim 9, wherein control messages for the establishment of the discovery context and/or update of the discovery context are implemented as non-access stratum NAS signaling.

15. The apparatus according to claim 9, wherein, when the first user equipment is in an idle state, the update of the discovery context is carried on a discovery update channel (DUCH).

16. The apparatus according to claim 9, wherein the at least one memory and the computer program code are further configured, with the at least one processor, to cause the apparatus at least to receive a report of beacon signals detected by one or more active user equipment so that the apparatus can track a location of idle user equipment on a cell level and the update of the discovery context is carried on the discovery update channel (DUCH) of the tracked cell.

17. A computer program, embodied on a non-transitory computer readable medium, wherein the computer program is configured to control a processor to perform a process, comprising:
establishing a discovery context for a first user equipment for a discovery of at least one second user equipment that a user of the first user equipment is interested in discovering;
allocating a beacon channel to the at least one second user equipment; and
transmitting to the first user equipment a request to establish a discovery context, the request comprising information on the allocated beacon channel.

* * * * *